United States Statutory Invention Registration [19]

[11] Reg. Number: H146

Decker et al. [43] Published: Oct. 7, 1986

[54] POWDER DISPERSAL UNIT

[75] Inventors: Leon J. Decker, Aberdeen; Arthur Cohen, Bel Air; Emmet Donnelly, Churchville, all of Md.

[73] Assignee: The United States of America as represented by the Secretary of the Army, Washington, D.C.

[21] Appl. No.: 754,552

[22] Filed: Jul. 15, 1985

[51] Int. Cl.[4] ..... B05B 9/04

[52] U.S. Cl. ..... 239/323; 222/389; 222/541; 222/381.5; 239/654

[58] Field of Search ..... 239/78, 81, 85, 320–323, 239/654, 325; 222/389, 541, 386.5; 102/427

[56] References Cited

U.S. PATENT DOCUMENTS

| | | | |
|---|---|---|---|
| 1,676,462 | 7/1928 | Root | 239/654 |
| 2,506,203 | 5/1950 | Forrest | 239/654 |
| 3,029,987 | 4/1962 | Gronemeyer | 222/541 |
| 3,118,573 | 1/1964 | Johnson | 222/541 |
| 3,380,383 | 4/1968 | Schnepfe, Jr. | 222/541 |
| 3,729,032 | 4/1973 | Tischlinger et al. | 222/386.5 |
| 4,279,383 | 7/1981 | Zverev et al. | 239/81 |
| 4,301,735 | 11/1981 | Menne et al. | 102/427 |
| 4,463,681 | 8/1984 | Tranin et al. | 102/427 |

*Primary Examiner*—Harold J. Tudor
*Attorney, Agent, or Firm*—Anthony T. Lane; Harold H. Card, Jr.; Michael C. Sachs

[57] ABSTRACT

This invention provides a reliable, operationally simple means of producing a suspension of dust or gas at the end wall of a shock tube prior to the arrival of the incident shock wave. It consists of a cylindrically shaped sample chamber having diaphragms at both ends and a cylinder-and-piston apparatus for driving a powder or other sample from the inside of the chamber into the shock tube.

15 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POWDER DISPERSAL UNIT

BACKGROUND OF THE INVENTION

1. Field of the Invention

This invention relates to shock tubes. More particularly, this invention relates to a new and improved device that will create a uniform dusty gas suspension in a shock tube.

2. Description of the Prior Art

In the study of chemical reactions of powdered materials at high temperatures and pressures, researchers have utilized reflected shock waves in shock tubes to study ignition and exposive behavior of energetic materials. Explosive limits and flammability of air suspensions of powdered coal, grain dust, propellants, etc. as functions of concentration and particle size can be determined by this technique. Since the shock waves are not visible but are instead a gradient of air pressure, suspensions of powder or dust created withn the shock tubes also provide a means of monitoring shock wave transients. Unless the powder or dust is uniformly distributed as a dusty gas adjacent the end wall of the shock tube, the interpretation of experimental results beomces considerably more difficult.

In the past, suspensions of dust or powders within gases have been produced in shock tubes by using the incident shock flow to disperse such powders placed upon aerodynamic foils having shapes such as a knife-edge or contoured disk. In another method, the suspension is produced by dispersing the powders from thin films. While these techniques are capable of generating a dusty gas in the test section of a shock tube, the powder cannot be uniformly distributed near the end wall and the time for formation of the suspension is controlled strictly by the incident shock wave itself. Thus, the test conditions are approximate at best.

In one previous method, an arrangement incorporating a vertically-oriented shock tube and a blower-and-solenoid valve assembly was used to produce a dusty gas in the shock tube chamber prior to initation of the shock wave. The solenoid valves, located on the side and end walls of the tube, are closed immediately before shock initiation. Placing a shock tube in a vertical plane and adding solenoids requires extensive modifications to the end-plate and sidewall, increasing overall cost and lessening the versatility of the test apparatus.

SUMMARY OF THE INVENTION

It is an object of the invention to generate a uniformly dispersed dusty gas at the end-wall of a shock tube.

It is a further object of the invention to precisely time the production of the dusty gas with respect to the arrival of the initial shock wave.

It is a further object of the invention to produce the desired dusty gas using a reliable and relatively inexpensive apparatus.

These objects asa well as others not enumerated are achieved by the invention, one embodiment of which may include a chamber means for storage of a powder sample, having an output opening through which the powder sample can exit, and a dispersal means for dispersing the powder from the chamber. The chamber means is provided with diaphragms at its input and output openings. The dispersal means comprises a bore having a piston therein and an electric primer assembly that drives the piston.

In operation, an electric primer creates an explosion driving the piston forward in the bore towards the chamber, which is situated at the far end of the bore. As the piston approaches the chamber, the first diaphragm ruptures under the increasing pressure of compressed gas. As the piston travels further, the second diaphragm ruptures permitting the compressed gas to carry a powder sample into the shock tube where turbulent mixing occurs. Photographs obtained using a high-speed framing camera show that a uniform distribution of powder has been achieved with the invention in less than two-thirds milliseconds after firing the primer and retained for more than seven milliseconds afterwards. It has also been found that by using a time-delayed gating pulse to activate the electric primer, one can achieve precise timing for the production of a uniformly dispersed suspension of particles prior to the arrival of the initial shock wave at the end wall of the shock tube.

BRIEF DESCRIPTION OF THE DRAWINGS

A more complete understanding of the present invention, as well as other objects and advantages thereof not enumerated, will become apparent upon consideration of the following detailed description, especially when considered in light of the accompanying drawings wherein.

DETAILED DESCRIPTION OF THE INVENTION

Figure 1:
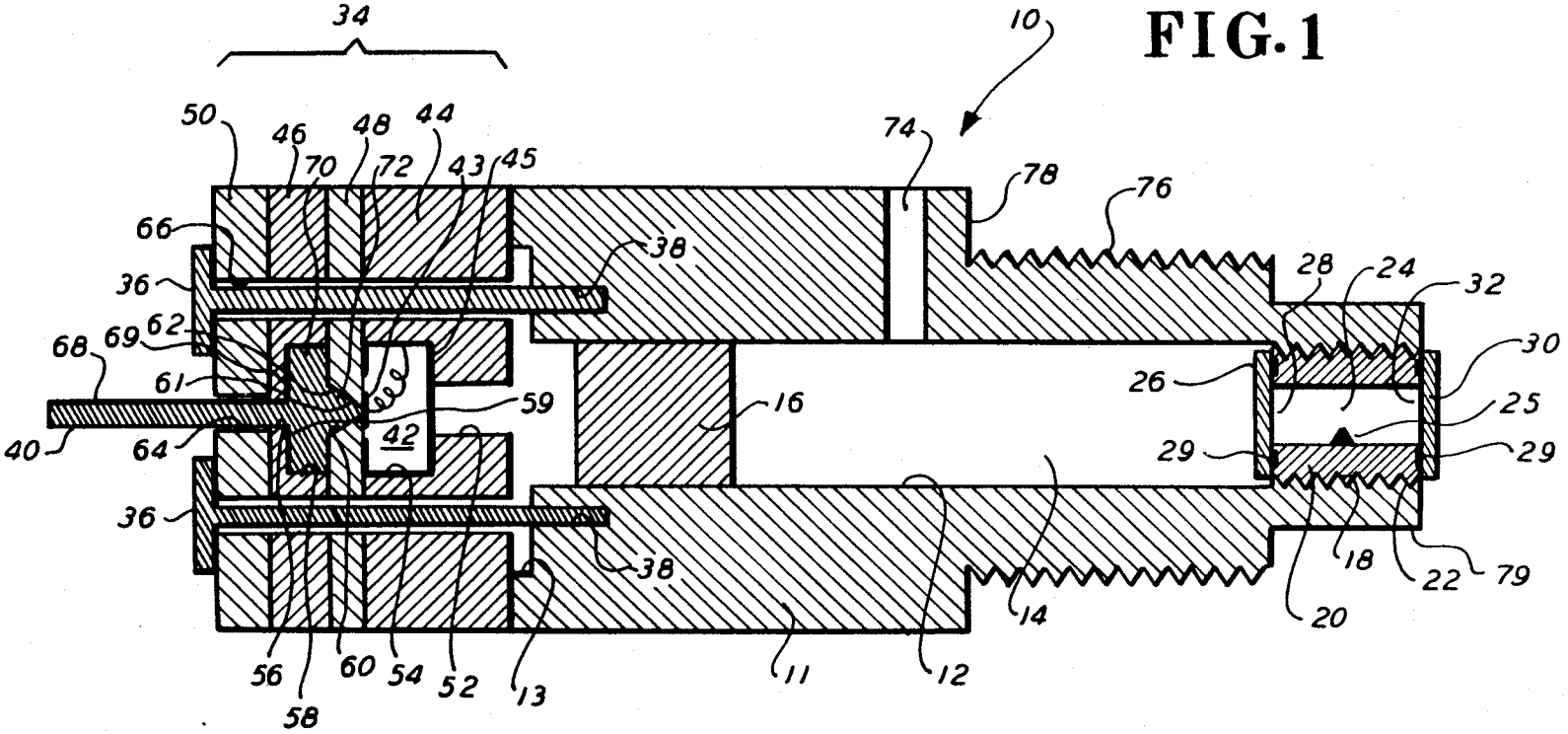
FIG. 1 is a cross-sectional view of the powder dispersal apparatus.

Referring therefore to FIG. 1, a powder dispersal apparatus according to the present invention is disclosed in cross-sectional view and designated generally by the reference numeral 10. The foundation of the apparatus is a generally cylindrical body 11 having a longitudinally axially extending bore 12 therethrough which, as is discussed below, cooperates with other structures to define a cavity 14 therein. Slidably received within cavity 14 is a deformable piston 16. Materials such as polycarbonate rsins (e.g., Lexan) may be used for the fabrication of the piston 16. The surface of bore 12 is smooth to allow relatively frictionless travel of the piston 16.

At one end of the body 11, there is provided a counterbore 13, as shown in FIG. 1. The other end of the bore 12 is provided with internal threads 18 for threadedly engaging a plug 20 having complementary threads formed on its outer surface 22. Plug 20 is generally cylindrically-shaped and is provided with a through-bore which defines an axial sample chamber 24 having an input opening 28 and an output opening 32. One end of the sample chamber 24 is closed by a first diaphragm 26 which covers the input opening 28 of the sample chamber 24. The other end of the sample chamber 24 is closed by a second diaphragm 30 which covers the output opening 32 of the chamber 24. The diaphragms 26 and 30 may be of aluminum foil or mylar sheet. They can be held in place with adhesives 29 or through the use of "O"-rings (not shown). A deposit of powder 25, which is the material that is ultimately used to create the dusty gas suspension, is placed in the sample chamber 24.

A detonator assembly designated generally by the reference numeral 34 is attached to the body 11 by way of assembly bolts 36 that are threadedly received within longitudinally-extending tapped bores 38 in the body 11. The detonator assembly 34 comprises a brass contact 40, an electric primer 42, brass plate 44, first and second phenolic backing plates 46 and 48, and steel supporting plate 50.

The brass plate 44, first and second phenolic backing plates 46 and 48, and steel supporting plate 50 are disc-shaped and have the same outside diameter. The brass plate 44 is machined with a throughbore 52 and a counterbore 54. The first phenolic backing plate 46 also has a throughbore 56 and a counter bore 58, which cooperate to define a radially-extending wall 59. The second phenolic backing plate 48 is provided with a frusto-conical bore 60 which defines a first circular axial opening 61 and a second circular axial opening 62. As best may be seen in FIG. 1, the second circular axial opening 62 is larger in diameter and coaxial with the first circular axial opening 61. The steel supporting plate 50 has a throughbore 64 through which the brass contact 40 passes without making physical contact. All four plates have offset bores 66 through which the assembly bolts 36 pass.

The brass contact 40, which may be machined from a single piece of metal, is radially symmetrical along its longitudinal axis and has three distinct portions, a stem portion 68, a middle portion 70, and a conical section 72. At one end is the stem portion 68, a solid member having a circular cross-section, comprising a major portion of the length of the contact 40. The middle portion 70 is generally circular in cross-section having an outside diameter greater than that of the stem portion 68. The stem portin 68 and the middle portion 70 cooperate at their intersection to define a radically extending surface 69. Conical section 72 is disposed at the end opposite the stem portion 68. The first and second phenolic backing plates 46 and 48 and the steel supporting plate 50 are configured as described above in order to match the contour of the brass contact 40. More specifically, the angles of the frusto-conical bore 60 and the conical section 72 are approximately equal providing positive registration of the brass contact 40 when the detonator assembly 34 is fully assembled.

The electric primer 42 has a center contact 43 and a case 45, where the two are electrically isolated. As is well-known in the art, the primer 42 contains an explosive such as gunpowder. The electric primer 42, which can be a commercially available unit such as the M52A3B1, manufactured by Remington Arms Co., is placed in the counterbore 54. Electrical contact is established between the electric primer 42 and the brass plate 44 through the primer case 45. When an electric potential is placed between the center contact 43 and the primer case 45, the primer 42 will be activated and explode.

The detonator assembly 34 may be assembled by using the steel supporting plate 50 as a base. First, the assembly bolts 36 are positioned in the offset bores 66 of the steel supporting plate 50. Second, the first phenolic backing plate 46 is positioned on the bolts 36 next to the steel supporting plate 50 with the counterbore 58 on the side opposite the steel supporting plate 50. Third, the stem portion 68 of the brass contact 40 is inserted in the throughbore 56 of the first phenolic backing plate 46 and then the steel supporting plate 50, until the radially-extending face 69 of the disc-shaped portion 70 of the brass contact 40 makes physical contact with the radially-extending wall 59 of the counterbore 58 of the first phenolic backing plate 46. Fourth, the second phenolic backing plate 48 is placed on the assembly botls with its second circular axial opening oriented towards the brass contact 40. Once in place, the frusto-conical bore 60 of the second phenolic backing plate 48 serves to limit movement of the brass contact 40. Fifth, the electric primer 42 is placed in the counterbore 54 of the brass plate 44 with the center contact 43 positioned away from the centerbore 52 as shown in FIG. 1. Finally, the brass plate 44 is placed on the bolts 36 adjacent the second phenolic backing plate 48, so that the conical section 72 of the brass contact 40 physically touches the center contact 43 of the electric primer 42.

As illustrated in FIG. 1, the bore 12 in the body 10 is provided with a vent port 74 to allow the piston 16 to achieve acceleration initially after detonation. The vent port 74 also serves as a pressure relief, allowing the gas generated by the electric primer 42 to exit from the cavity 14.

The external surface of body 11 is relieved to define a reduced diameter section 76 which is threaded. Section 76, extending approximately one-half the length of the body 11, further defines a radially-extending face 78 generally as shown in FIG. 1, which permits the entire assembly 10 to be threadedly engaged with a shock tube (not shown). The end of body 11 adjacent threaded section 76 is further relieved to define an annular smooth surface 79.

In operation, an incident shock wave in the shock wave tube (not shown) is used to trigger the apparatus. More specifically, a detector, as discussed below in detail, sensing the initial shock wave in the shock tube, directs a triggering circuit to generate a time-delayed gated pulse, which is conducted through the brass contact 40, detonating the electric primer 42 within approximately one-to-five milliseconds prior to the arrival of the incident shock wave at the end wall of the shock tube (not shown). This timing ultimately ensures that dust will be thoroughly and uniformly dispersed within the test gas at the time of the shock wave reflection. The detonation of the electric primer 42 drives the deformable piston 16 down the smooth bore 12. As the leading edge of the piston 16 passes the vent port 74, the gases in the bore 12 between the first diaphragm 26 and the piston 16 are trapped and compressed. The increasing pressure of the compressed gas ruptures the first diaphragm 26 and soon thereafter ruptures the second diaphragm 30. The deposit of powder 25, placed in the sample chamber 24, is carried by the compressed gas into the adjacent shock tube (not shown) through the ruptured second diaphragm 30. Once in the shock tube, it is turbulently mixed with the test gas (not shown).

Figure 2:
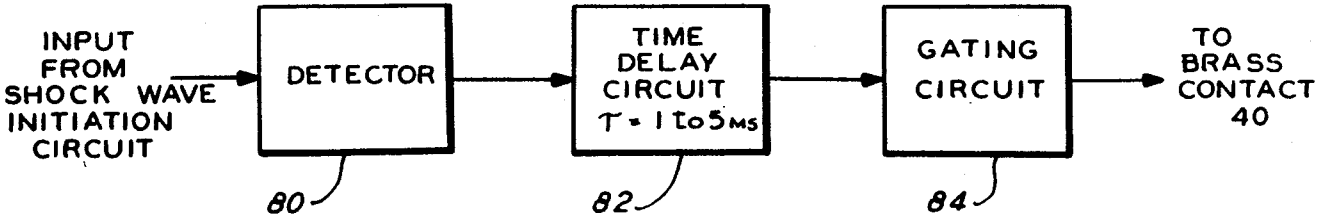
FIG. 2 is a suggested embodiment for the triggering circuitry.

A suggested arrangement for the triggering circuitry is illustrated in FIG. 2. The first stage, a detector 80, receives an input signal from the shock wave tube apparatus (not shown) indicating the incident shock wave. The detector 80 provides a starting pulse at time to a time-delay circuit 82, which is nominally adjusted to provide an output within one-to-five milliseconds. The output of the time-delay circuit 82 drives a gating circuit 84 which in turn provides an output to the brass contact 40 (FIG. 1). The output of the gating circuit 84 may be a square wave pulse or some other appropriate wave shape.

The apparatus 10 can be constructed using manufacturing techniques and materials well-known to those having ordinary skill in the art. It may be desirable to perform tests using other media, thus the plug 20 can be constructed from a porous, sintered bronze. This will permit the use of a liquid sample for producing a mist for testing of liquids within the shock tube.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

We claim:

1. A powder dispersal apparatus, comprising:

chamber means for storing powder, having an output opening through which the powder can exit the chamber means; and dispersal means for dispersing said powder from said chamber through said exit opening.

2. A powder dispersal apparatus as set forth in claim 1 above, which said dispersal means generates a compressed gas which forces said powder out of said chamber means.

3. A powder dispersal apparatus as set forth in claim 2 above, where said chamber means has an input opening which communicates with said dispersal means.

4. A powder dispersal apparatus as set forth in claim 3 above, where said idspersal means comprises a bore and piston which generates said compressed gas and where one end of the said bore is connected to said input opening.

5. A powder dispersal apparatus as set forth in claim 4 above, where said chamber means further comprises a diaphragm at said input opening.

6. A powder dispersal apparatus as set forth in claim 5 above further comprising a diaphragm at said output opening of said chamber means.

7. A powder dispersal apparatus as set forth in claim 6 above where said cylinder of said dispersal means is provided with a vent means.

8. A powder dispersal apparatus as set forth in claim 7 above where said idspersal means further comprises an explosive charge means for driving said piston.

9. A powder dispersal apparatus as se4t forth in claim 8 above where said explosive charge is an electric primer.

10. A powder dispersal apparatus as set forth in claim 9 above where said cylinder, input opening, and output opening are colinear.

11. A powder dispersal apparatus as set forth in claim 4 where said piston is deformable.

12. A powder dispersal apparatus as set forth in claim 9 where said explosive charge means further comprises a holding means which slidably receives said electric primer and electric contract means which conveys an electric voltage to said electric primer.

13. A powder dispersal apparatus as set forth in claim 9 where said electric primer is triggered by a time-delayed gated pulse.

14. A powder dispersal apparatus as set forth in claim 9 further comprising a triggering circuit means for delivering a time-delayed gated pulse to said electric primer.

15. A powder dispersal apparatus as set forth in claim 14 where said triggering circuit means comprises a detector circuit, a time-delay circuit, and a gating circuit.

* * * * *